United States Patent [19]
Fletcher et al.

[11] 3,915,012
[45] Oct. 28, 1975

[54] AUTOMATIC BIOWASTE SAMPLING

[76] Inventors: James C. Fletcher, Administrator of the National Aeronautics and Space Administration, with respect to an invention of G. L. Fogal, Wayne, Pa.; Richard L. Sauer, League City, Tex.

[22] Filed: Nov. 22, 1974

[21] Appl. No.: 526,449

[52] U.S. Cl. ............................... 73/421 R; 128/2 F
[51] Int. Cl.² ..................... G01N 1/04; A61B 10/00
[58] Field of Search ................. 73/421 R; 4/10, 115; 128/2 F, 283

[56] References Cited
UNITED STATES PATENTS

| | | | |
|---|---|---|---|
| 3,540,433 | 11/1970 | Brockman | 128/2 F |
| 3,625,064 | 12/1971 | Hinman et al. | 73/421 R |
| 3,727,241 | 4/1973 | Drouhard | 4/10 |
| 3,747,622 | 7/1973 | Reinhall | 73/424 |

Primary Examiner—S. Clement Swisher
Attorney, Agent, or Firm—Marvin J. Marnock; John R. Manning; Marvin F. Matthews

[57] ABSTRACT

In a sampling system for acquiring biowaste samples in a space craft, an automatic biowaste system for space environment for sampling and disposal of feces and vomitus includes a storage container and an associated seat. The storage container has a slide valve which is releasably locked in positions placing the seat into and out of communication with the container. A passage from the seat leads to a rotating platform with peripherally located vertical tines. The rotating platform disperses waste radially. A retrievable, porous sampling strip is insertable about the periphery of the rotating platform and is retractable into a separate sampling container. The sampling strip is retrievable into a plastic storage container for subsequent analysis.

10 Claims, 6 Drawing Figures

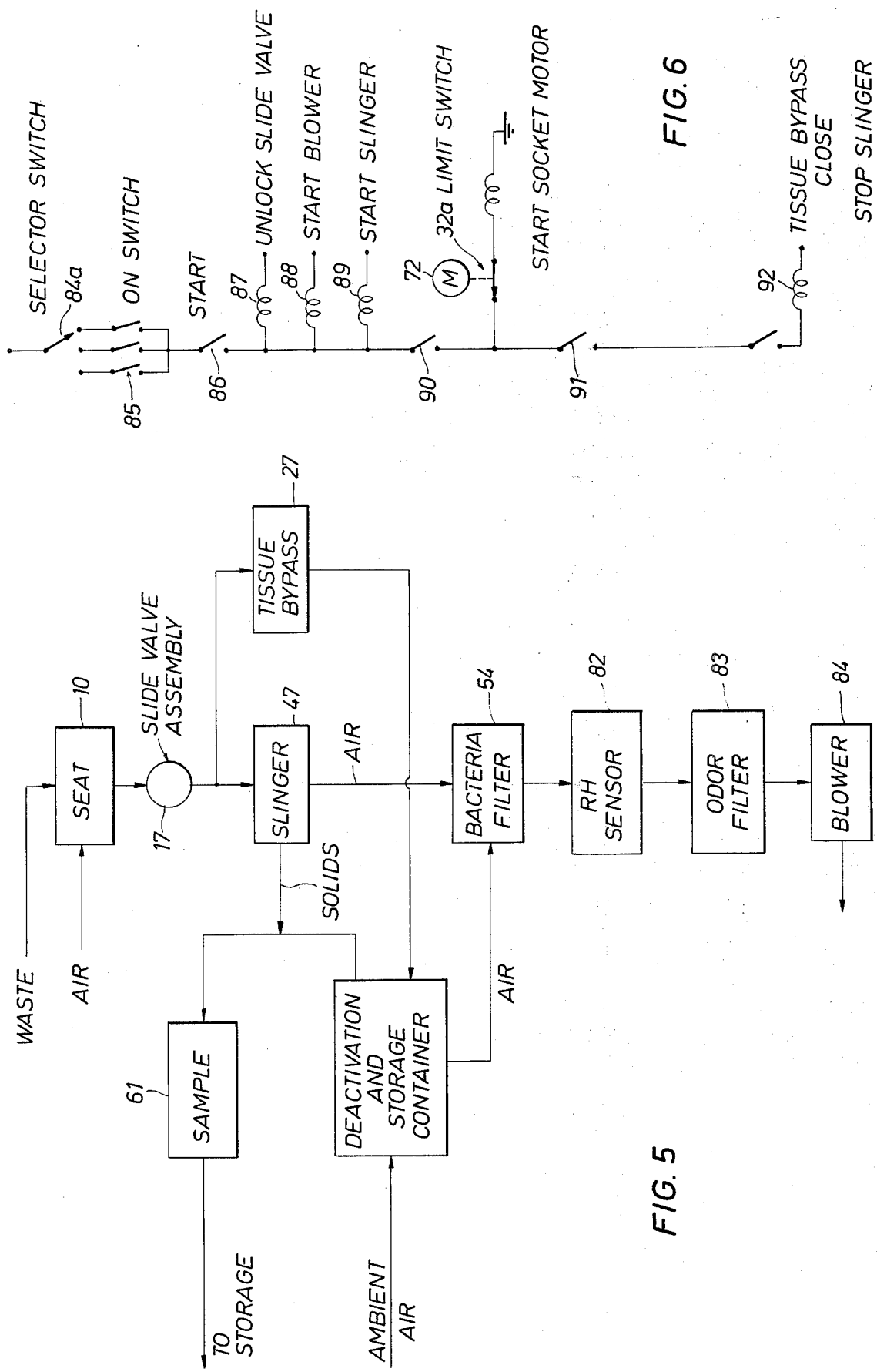

3,915,012

AUTOMATIC BIOWASTE SAMPLING

ORIGIN OF THE INVENTION

This invention described herein was made in the performance of work under a NASA Contract and is subject to the provisions of Section 305 of the National Aeronautics and Space Act of 1958, Public Law 85–568 (72 Statute 435; 42 U.S.C. 2456).

FIELD OF THE INVENTION

This invention relates to a solids biowaste sampling system for use under space flight conditions and more particularly, for a sampling system for reliably and efficiently obtaining a sample of waste disposal in a space environment.

BACKGROUND OF THE INVENTION

The present invention is used in connection with the discrete collection, storage or sampling of feces and vomitus from a number of subjects. With the onset of longer manned space flights, it is becoming increasingly imperative that various medical experiments be performed to determine what, if any, effect long duration exposure to zero gravity and a restricted, closed environment will have on the crew. A number of biomedical problems, such as bone demineralization and microbial cross-contamination between the crewmen, are well documented in the literature for the one gravity case; however, the extent to which these conditions progress is not known for the actual flight situation. Items of current experimental interest are: Mineral Balance, Bone Densitometry, and Bioassay of Body Fluids. The Table below lists the constituents of interest in feces, and vomitus required for these three experiments.

TABLE

| | Feces | Vomitus |
|---|---|---|
| Collection | yes | yes |
| Measure | Wet Mass ± 2% | Wet Mass ± 2% |
| Sample | Yes | Yes |
| Size | Total/Each | Total/Each |
| Store | Yes | Yes |
| Return | Yes | Yes |
| Chemicals of Interest | Potassium | Potassium |
| | Magnesium | Magnesium |
| | Calcium | Calcium |
| | Nitrogen | Nitrogen |
| | Phosphorus | Phosphorus |
| | Chromium | Chromium |

The present invention provides a means for obtaining samples for a determination of the chemicals of interest.

SUMMARY OF THE INVENTION

The present invention involves a system for receiving samples of wastes. The space craft system includes a storage container for the wastes and a seat located on the storage container. The storage container is kept closed by a slide valve which is disposed between the seat and the container and which can be selectively locked in an open or closed position. Within the storage container is a passageway extending from the seat to horizontal slinger assembly. Between the seat and the slinger assembly is a tissue bypass which in one position permits passage of a waste sample to the slinger assembly and, in another position, isolates the slinger assembly and permits delivery of tissue directly into the interior of the storage container. The slinger assembly has a rotating platform disposed in the passageway and serves to radially distribute biowaste materials transverse to the vertical in a shredded form. A porous sampling strip is selectively disposed circumferentially around the slinger platform to receive a sample. The sampling strip is insertable and retrievable from a side of the storage container and is containable in a separate sampling container. The biowaste material is collected by the sampling strip for retention and examination.

BRIEF DESCRIPTION OF THE DRAWINGS

FIG. 5 is a schematic representation of the system and its included functions; and FIG. 6 is a schematic representation of an electrical control system for use with the present invention.

DESCRIPTION OF THE PREFERRED EMBODIMENT

Figure 1:
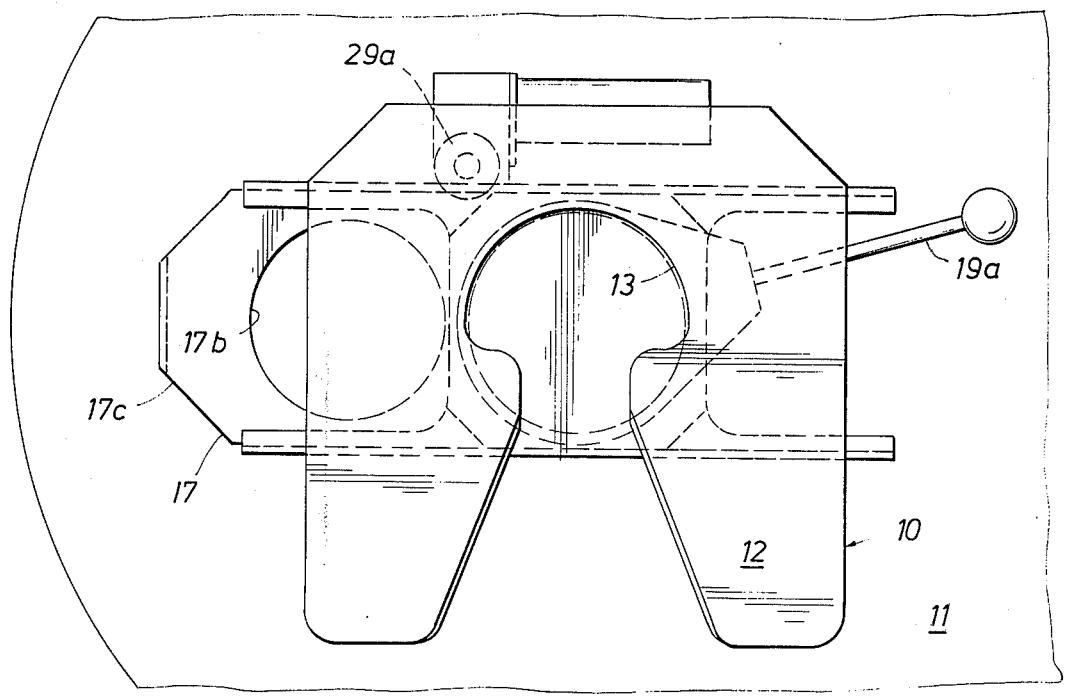
FIG. 1 is a partial plan view of the disposal system in which the present invention is embodied.
Figure 2:
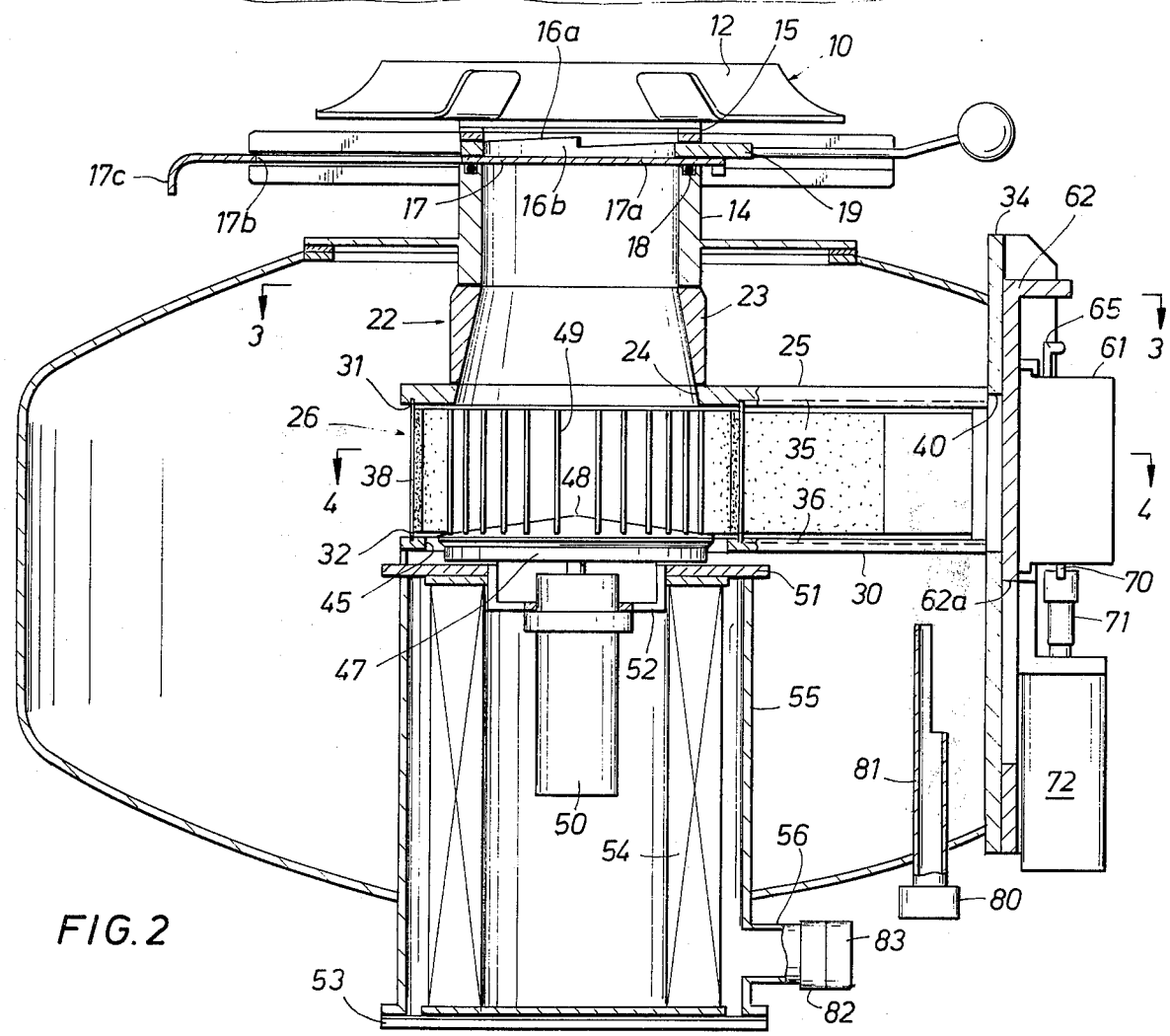
FIG. 2 is a view in vertical cross-section through the disposal system of FIG. 1.

This sytem relates to a sampling arrangement for the collection of feces in a space flight or low gravity environment for obtaining discrete samples for analysis. Referring now to FIGS. 1 and 2, the space system includes major components of a seat assembly 10 and a waste storage container 11. The seat assembly 10 is coupled to the upper part of the storage tank 11 and includes a seating member 12 which is suitably configured for comfort, load distribution and positional alignment of a human buttocks. A suitable opening 13 is provided in the seating surface 12 for access of waste matter to the storage container or tank 11. The seating member 12 is attached to an upstanding tubular member 14 which, in turn, is attached to a flange about an upper opening in the container 11. The container 11 provides storage volume and physical support for the various components of the system.

The container 11 is constructed from aluminum to form an oblate spheroid shell and may be in multiple parts for convenience of construction. At the upper end of the container the flanged opening is provided for support of the tubular member 14. In the section of the tubular member 14 just below the seating surface 12, there are air access openings 15, a pair of cam locking surfaces 16a and 16b and a horizontally arranged slide valve 17.

The slide valve 17 is a rectangularly shaped plate member which slides horizontally in guiding grooves. The valve 17 has a solid surface 17a which is positionable over the opening of the tubular member 14 and an adjacent cylindrical opening 17b which is positionable over the opening of the tubular member 14 when the valve is displaced in a horizontal direction. The basic function of the slide valve 17 is to isolate the storage container from direct access to ambient. A curved handle portion 17c on one end of the slide valve is used as a handle when it is desired to slide the valve transversely between positions opening and closing the tubular member 14. An annular sealing member 18 is located in the upper surface of the tubular member 14 below the valve 17 to provide a tight seal between the slide valve and the tubular member.

A locking mechanism is provided for releasably locking the slide valve 17 in either an "open" or "closed" position. The locking mechanism includes a separation in the tubular member 14 into upper and lower housing parts. The valve member 17 and a camming plate member 19 are disposed in the separation of the tubular member 14. The upper housing part has a downwardly facing cam locking surface 16a which is fixed relative to the tubular member 14. As illustrated, a suitable locking surface has an incline with respect to the vertical. The camming plate member 19 is provided with a matching camming surface 16b complementarily arranged relative to the surface 16a. A handle 19a is attached to the cam plate member 19 and the plate member 19 is rotatably mounted so that the handle 19a can move the lower camming surface 16b relative to the upper camming surface 16a between a position locking the slide valve 17 to the member 14 and a position permitting sliding movement of the slide valve 17. Bearings (not shown) can be used to facilitate the relative movement between the camming surfaces. The total swing of the handle 19a can be about 30°. The design of the locking mechanism is intended to minimize wear on the seal 18.

Figure 3:
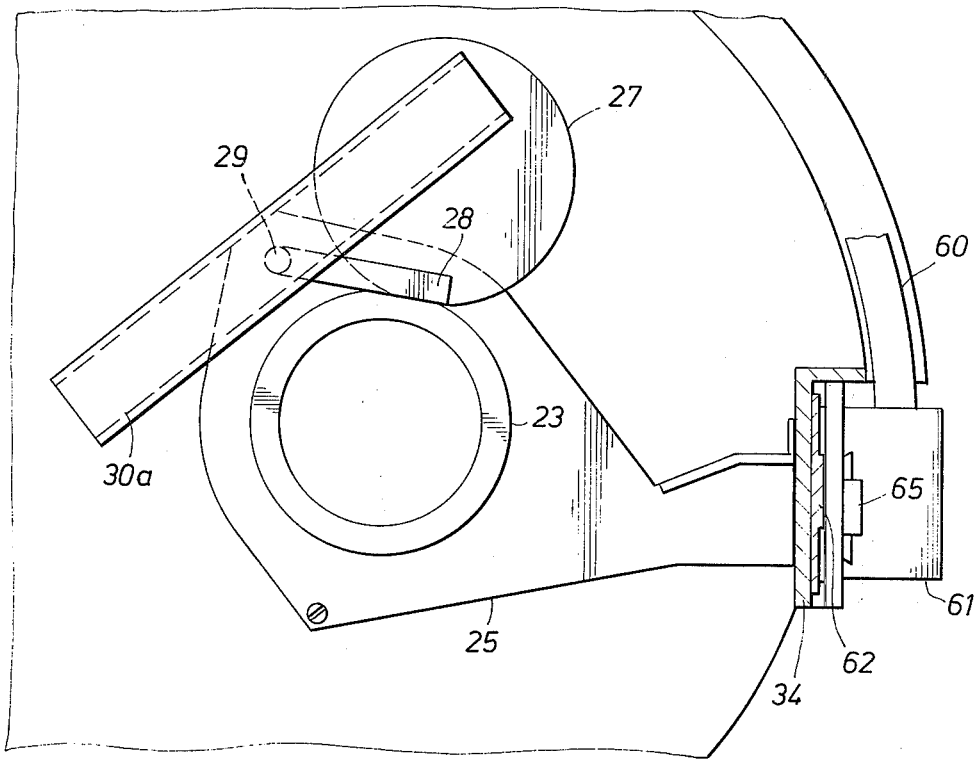
FIG. 3 is a view taken along line 3—3 of FIG. 2.

Below the tubular member 14 and within the storage container 11 is a tissue bypass assembly 22. The bypass assembly 22 is designed to prevent papers or the like from getting into the feces sampling system which is below the bypass assembly. As shown in FIGS. 2 and 3, the bypass assembly 22 includes a tubular member 23 which has its opening alignable with the opening of the tubular member 14 and an opening 24 in the upper plate 25 of the sampling assembly 26. On a common plane with the lower surface of member 23, and adjacent thereto, is a cylindrically shaped cover plate member 27 (see FIG. 3). The cover plate member 27 is attached to the member 23 and to a pivot arm 28. The pivot arm 28 is journaled for rotation by a vertical pivot pin 29. The pivot pin 29 is mounted in an upper beam member 30a and the upper plate 25. The center axes of the plate member 27 and the tubular member 23 are located at equal radial distances from the axis of the pivot pin 29 so that the member 23 and plate 27 may be rotated along an arc from the position shown to a position where the plate 27 covers the opening 24. When the plate 27 covers the opening 24, tissue or other waste can be isolated from reaching the sampling assembly 26 and can be bypassed to the interior of the chamber 11. An external motor 29a (FIG. 1) is attached to the pin 29 for rotating the plate member 27 and tubular member 23. When the motor is actuated by a tissue bypass switch (not shown), the cover 27 will be placed over the opening 24, and the tissue can then flow into the surrounding storage compartment. Upon closing of the slide valve 17, the tubular member 23 is returned to its normal position as indicated in the drawings. The tissue bypass parts are made from aluminum alloy and tufram coated to add corrosion resistance and a teflon like finish.

Figure 4:
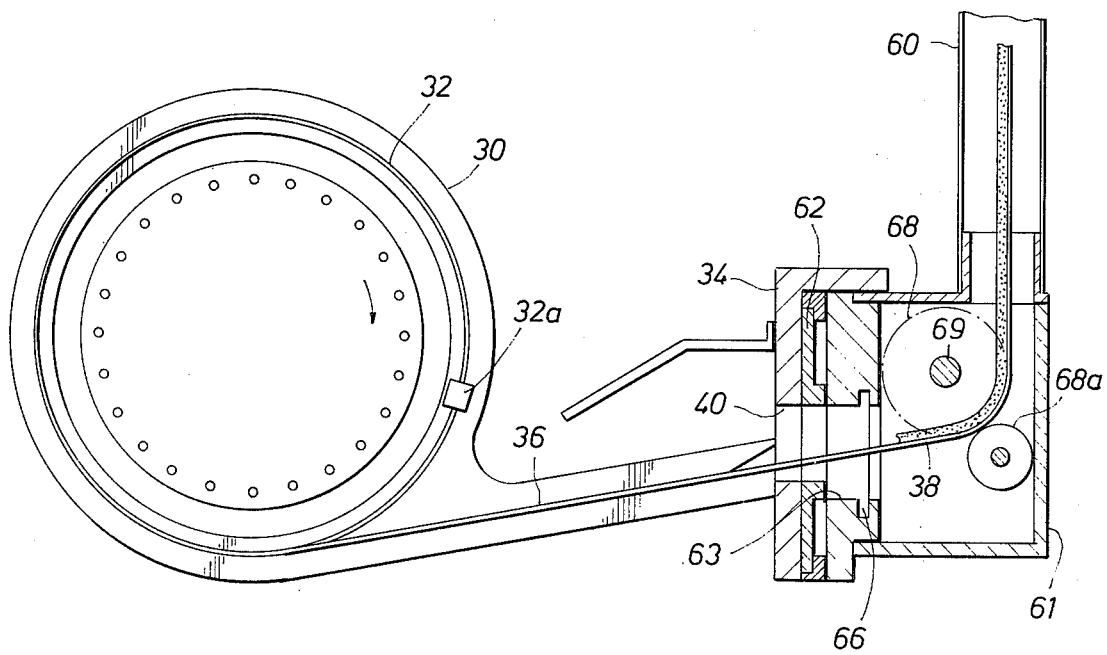
FIG. 4 is a view taken along line 4—4 of FIG. 2.

The sampling assembly 26 includes spaced apart upper and lower plate members 25 and 30, the lower plate member 30 being shown also in FIG. 4. The upper and lower plate members 25 and 30 have parallel surfaces larger than the opening 24. In the respective plate members are circular guiding groove 31 and 32, which circumscribe the openings 24 and 45 in the plate members. The plate members 25 and 30 also have flat surfaces extended to a vertical closure plate 34 which forms a vertical flat side wall of the container. In the extended surfaces of the plate members 25 and 30 are grooves 35 and 36 which are straight and which tangentially open into the circular grooves 31 and 32. A sample collecting strip 38 in the form of a flexible elongated member 38 has upper and lower edge surfaces receivable into the grooves 31, 32, 35 and 36. The collecting strip 38 can thus be inserted through a rectangular opening 40 in the vertical plate 34 and passed along the straight grooves 35 and 36 into the circular grooves 31 and 32 to a position where the opening 24 is nearly encircled by the collecting strip 38.

The slinger assembly 26 is mounted between the upper and lower plate members 25 and 30. In an opening 45 in the lower plate member 30 (which is larger in diameter than the opening 24), is a rotating slinger plate member 47. The plate member 47 which is a cylindrically shaped platform with an upper conically-shaped surface 48 and peripherically located upstanding pins or tines 49. The pins 49 are located on a circle which is greater in diameter than the diameter of the opening 24 in the upper plate member 25. The platform is rotatably supported by the shaft of a driving motor 50. The motor 50 is mounted on a transverse frame member 51 which has openings 52 for air flow purposes. The frame member 51 is mounted on a tubular frame member 55 which is closed at its bottom end by a cover plate 53. A toroidal shaped bacteria filter 54 is disposed within the tubular member 55 and positioned between the openings 52 and an outlet opening 56 on the tubular member 55. The slinger 47 is made from aluminum alloy and tufram coated to minimize adhesion. The tines 49 are made from stainless steel.

From the description thus far, it will be appreciated that there is a central passage defined by the tubular member 14, the tissue bypass 22, and the opening 24 to a rotating platform 47 with an upper conical surface 48. Air flow occurs from the openings 15 in the member 14 through the central passage and through the openings 52 and filter 54 to the outlet 56. The biowaste sample, upon impact with the rotating slinger, is distributed to the peripherially located collection strip 38. As illustrated in the drawings, from the top plan view, rotation of the platform 47 is in a clockwise direction.

The collecting strip 38 when not in use is normally enclosed within an elongated flexible, plastic bag member 60, which preferrably is constructed from teflon. The bag member 60 is attached to a valve housing 61. The housing 61 releasably attaches to the vertical plate 34 of the container by a horizontal sliding movement where upper and lower tongue members on the housing 61 slide into upper and lower grooves on the plate 34. The opening 40 of the vertical plate 34 of the container is normally closed by a vertically movable sliding door member 62. The door member 62, as shown in FIG. 2, has a rectangularly shaped opening 62a below a solid portion. The opening 62a can be placed in registry with the plate opening 40 by vertical movement of the door member 62. The door member 62 is suitably mounted by guide means for accomplishing the vertical movement. The valve housing 61 has a vertical rectangularly shaped opening 63 which aligns with the plate opening 40 when the valve housing 61 is attached to the plate 34. A vertically slidable door plate 65 (FIG. 2) is received in a vertical groove 66 in the housing 61. The door plate 65 provides for isolation of the sample within the housing 61 and bag member 60.

Within the housing 61 are upper and lower sprocket wheels 68 (only one shown) which mesh with perforation disposed along the length of the collecting strip 38. The drive wheels 68 are on a driving shaft 69 which has a tang 60 which slidably interfits with a slot on a shaft 71 driven by a motor 72. When the housing 61 is attached to the plate 34, the door 65 can be removed from the housing opening and the motor 72 operated to feed the strip 38 into the groove system between the plates 35 and 36. The length of the strip 38 is such that it can be run into the circular grooves to nearly circumscribe the circumference of the slinger while retaining its other end in registry with the sprocket. The motor 72 can be reversed to retract the strip into the bag member 60 after a sample has been collected. Back-up rollers 68a are provided to maintain registry of the strip with the sprocket wheels 68. The groove 32 is provided with a limit switch 32a which will cut off the power to the motor 72 automatically when the strip 38 engages the switch 32a.

The housing 61 is made of aluminum alloy in the shape of a hollow box. The strip 38 is made from thin stainless steel foil. The portion of the strip which surrounds the slinger when driven in place is lined with a layer of foam material with wide open pores.

A blower 80 is attached to an inlet pipe 81 into the container 11 for providing transport and drying air. In the outlet 56 is a relative humidity sensor 82 an odor filter 83.

A functional flow diagram as depicted in FIG. 5 illustrates the program of the system. Waste and air are input at the seat with the slide valve 17 in an open condition. The waste can go to either the slinger 47 or tissue bypass 22 dependant upon the position of the tissue bypass. From the slinger 47, the waste can be collected by a sample strip 388 or, in the absene of a strip 38, sent to the storage container 11. From the tissue bypass, the waste is sent directly to the storage container 11. The input air exists from the system through a bacteria filter. A blower 84 is used to pull air through the system and an R.H. Sensor 82 and odor filter 83 are provided to monitor and purify the air returned to the ambient.

The electrical control and interrelationship is schematically illustrated in FIG. 6. A selector switch 84a is used as a identifier of the subject and by position encodes the sample strip 38. The "on" switch 85 electrically arms the system. The "start" switch begins the operation by 1) operating a solenoid latch 87 to unlock the slide valve 17, 2) by operating a solenoid switch 88 to start the blowers 84 and 80, and 3) by operating a solenoid switch 89 to start the slinger motor 50. Next, to take a sample, the housing 61 is coupled to the unit and the gates 62 and 65 opened. This operation conditions a switch 90 which can be operated to start the motor 72 and the strip 38 is inserted in place. The motor 72 is stopped upon actuation of the limit switch 32a. After deposit of the sample, a tissue bypass switch 91 is actuated which actuates a solenoid 92 and places the cover plate 27 over the slinger 47, the strip reverses out to its container. The tissue bypass is returned to its initial position, the slinger is stopped, and the sequence is terminated.

In the operation of the system, the cycle sequence after actuating the switches 84a – 86 as started by opening the slide valve 17. This action turns on the blower and slinger motors 50 and 80. Thus, transport airflow is into the storage container as the valve is opened preventing possible odor or debris flow to ambient from the storage container. After the user is seated, the transport air under the seating surface conveys waste "down" through the tubular member 14 to the slinger 47. The rotating slinger (about 2000 RPM) shreds and projects the resulting particles outward to form a thin layer around the inner periphery of the storage container. For tissue disposal, the tissue bypass switch is operated and the tube 23 is rotated out of position and a cover plate 27 is positioned to cover the slinger. Tissue is then permitted to be bypassed by the transport air to the container.

The sampling is included in a collection cycle by inserting the collecting strip 38 about the slinger to trap a sample. The strip is retrievable into the collection bag 60 by reversing the driving motor 72.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. In a biowaste sampling and disposal system for use in space conditions which includes a container means having a vertical axis, seating means on said container means, said seating means being disposed about said vertical axis, disposal means in said container including cylindrically shaped platform arranged normal to said vertical axis and means for rotating said platform about said vertical axis, passage means extending from said seating means to said platform, vertical pins disposed about the periphery of said platform for shreading a sample, the improvement comprising sample retention means which includes a porous strip member and means for guiding said strip member to and from a position about the periphery of said platform so that a sample may be passed from said passage to said platform and distributed to said strip member by said vertical pins on said platform.

2. The apparatus as defined in claim 1 and further including means in said passage means for selectively isolating said sample retention means from said passage means.

3. The apparatus as defined in claim 2 wherein said isolating means includes an annular plate member and a ring member disposed side-by-side, said plate member and ring member having vertical axis disposed on an arc, means attached to said ring member and said plate member for moving said plate member and ring member in an accurate manner so that one of said plate member and ring member are in said passage means.

4. The apparatus as defined in claim 1 wherein said guiding means comprise upper and lower plate members having aligned circular grooves and tangential grooves where the tangential grooves terminate at a side wall opening of the container and said strip member is guided in said grooves by its edge surfaces.

5. The apparatus as defined in claim 4 and further including a housing and bag for said strip member, said housing being selectively attachable to the side wall of the container in registry with its side wall opening, said strip member having perforations along its length, means for moving said strip member including sprocket wheels in said housing.

6. The apparatus as defined in claim 5 and further including, in said driving means, a motor mounted on said container means and a slidable interconnection means between the shaft for said sprocket wheels and said motor.

7. The apparatus as defined in claim 6 and further including gate means respectively for said side wall of said container and for said housing for selectively closing of said side wall and said housing.

8. The apparatus as defined in claim 5 and further including means on said grooves for stopping said moving means when said strip member has reached a preselected position in said grooves.

9. The apparatus as defined in claim 5 wherein said strip member includes a layer of foam material having wide open pores.

10. The apparatus as defined in claim 9 wherein said strip member is constructed of stainless steel foil.

* * * * *